United States Patent
Frazier et al.

(10) Patent No.: US 9,139,974 B2
(45) Date of Patent: Sep. 22, 2015

(54) UNDERWATER COMPRESSED FLUID ENERGY STORAGE SYSTEM

(75) Inventors: Scott Raymond Frazier, Golden, CO (US); Brian Von Herzen, Minden, NV (US)

(73) Assignee: Bright Energy Storage Technologies, LLP, Arvada, CO (US)

( * ) Notice: Subject to any disclaimer, the term of this patent is extended or adjusted under 35 U.S.C. 154(b) by 1112 days.

(21) Appl. No.: 12/889,013

(22) Filed: Sep. 23, 2010

(65) Prior Publication Data

US 2011/0070032 A1 Mar. 24, 2011

Related U.S. Application Data

(60) Provisional application No. 61/245,279, filed on Sep. 23, 2009, provisional application No. 61/309,415, filed on Mar. 1, 2010, provisional application No. 61/364,364, filed on Jul. 14, 2010, provisional application No. 61/364,368, filed on Jul. 14, 2010.

(51) Int. Cl.
*E02D 9/00* (2006.01)
*E02D 29/00* (2006.01)

(52) U.S. Cl.
CPC .................. *E02D 29/10* (2013.01); *Y02E 10/38* (2013.01); *Y02E 60/17* (2013.01)

(58) Field of Classification Search
CPC ........................................................ F03G 7/04
USPC ............ 585/15, 950; 166/354, 352, 357, 248, 166/267, 302; 60/641.6, 641.7; 418/5–13, 418/15, 61.2; 417/423.1; 429/12, 30, 34, 38
See application file for complete search history.

(56) References Cited

U.S. PATENT DOCUMENTS

| | | | | |
|---|---|---|---|---|
| 3,643,426 A | * | 2/1972 | Janelid | 60/772 |
| 3,670,839 A | | 6/1972 | Savit | |
| 3,783,615 A | | 1/1974 | Hubers | |
| 3,797,973 A | | 3/1974 | Prasse et al. | |
| 3,866,058 A | * | 2/1975 | Lenssen | 290/52 |
| 3,883,273 A | | 5/1975 | King | |
| 3,895,493 A | | 7/1975 | Rigollot | |
| 3,896,898 A | | 7/1975 | Kirby et al. | |
| 3,916,634 A | | 11/1975 | Woodruff | |
| 3,953,971 A | * | 5/1976 | Parker | 60/641.6 |
| 3,970,050 A | | 7/1976 | Hoadley | |
| 3,996,741 A | | 12/1976 | Herberg | |
| 4,018,548 A | * | 4/1977 | Berkowitz | 418/61.2 |
| 4,055,145 A | * | 10/1977 | Mager et al. | 119/212 |

(Continued)

FOREIGN PATENT DOCUMENTS

| | | |
|---|---|---|
| CA | 2027113 A1 | 4/1992 |
| CN | 2168973 Y | 6/1994 |

(Continued)

*Primary Examiner* — Thomas Denion
*Assistant Examiner* — Shafiq Mian
(74) *Attorney, Agent, or Firm* — Ziolkowski Patent Solutions Group, SC (57) ABSTRACT

A compressed fluid storage system includes a bi-directional compressor/expander (C/E) unit constructed to compress fluid during a first operational mode and allow expansion of fluid in a second operational mode, a fluid storage system positioned on a sea floor under a body of water, and a piping system positioned between the C/E unit and the fluid storage system and configured to pass fluid between the C/E unit and the fluid storage system.

31 Claims, 5 Drawing Sheets

(56) References Cited

U.S. PATENT DOCUMENTS

| | | | |
|---|---|---|---|
| 4,206,601 A | 6/1980 | Eberle | |
| 4,231,873 A * | 11/1980 | Swigger | 210/170.05 |
| 4,232,983 A | 11/1980 | Cook et al. | |
| 4,245,475 A | 1/1981 | Girden | |
| 4,289,425 A | 9/1981 | Ootsu | |
| 4,335,977 A * | 6/1982 | Ihli | 210/170.03 |
| 4,384,459 A * | 5/1983 | Johnston | 60/641.7 |
| 4,391,552 A | 7/1983 | O'Hara | |
| 4,399,656 A * | 8/1983 | Laing et al. | 60/659 |
| 4,444,024 A * | 4/1984 | McFee | 62/401 |
| 4,454,721 A | 6/1984 | Hurlimann et al. | |
| 4,560,884 A | 12/1985 | Whittecar | |
| 4,760,701 A * | 8/1988 | David | 60/595 |
| 4,781,029 A * | 11/1988 | SerVaas | 60/641.7 |
| 4,802,431 A * | 2/1989 | Pollack | 114/230.13 |
| 4,848,445 A | 7/1989 | Harper | |
| 4,873,828 A | 10/1989 | Laing et al. | |
| 5,184,936 A | 2/1993 | Nojima | |
| 5,205,720 A | 4/1993 | Nagata | |
| 5,214,932 A * | 6/1993 | Abdelmalek | 62/238.4 |
| 5,241,817 A * | 9/1993 | George, Jr. | 60/39.182 |
| 5,340,283 A | 8/1994 | Nagata | |
| 5,391,067 A | 2/1995 | Saunders | |
| 5,394,709 A * | 3/1995 | Lorentzen | 62/402 |
| 5,490,559 A * | 2/1996 | Dinulescu | 165/148 |
| 5,537,822 A | 7/1996 | Shnaid et al. | |
| 5,645,950 A * | 7/1997 | Benz et al. | 429/429 |
| 5,833,446 A * | 11/1998 | Smith et al. | 418/201.1 |
| 5,841,733 A | 11/1998 | Bouyoucos et al. | |
| 5,855,474 A * | 1/1999 | Shouman | 418/6 |
| 5,946,909 A | 9/1999 | Szpur | |
| 6,018,947 A | 2/2000 | DeMarco et al. | |
| 6,116,027 A * | 9/2000 | Smith et al. | 60/648 |
| 6,523,347 B1 * | 2/2003 | Jirnov et al. | 60/651 |
| 6,575,712 B1 | 6/2003 | Slavchev | |
| 6,589,033 B1 * | 7/2003 | Johnson et al. | 418/13 |
| 6,659,065 B1 | 12/2003 | Renegar | |
| 6,748,737 B2 | 6/2004 | Lafferty | |
| 6,863,474 B2 | 3/2005 | Webster et al. | |
| 6,964,165 B2 | 11/2005 | Uhl et al. | |
| 7,097,436 B2 | 8/2006 | Wells | |
| 7,216,483 B2 | 5/2007 | Takeuchi | |
| 7,240,478 B2 * | 7/2007 | Kopko | 60/39.17 |
| 7,281,371 B1 | 10/2007 | Heidenreich | |
| 7,362,490 B2 | 4/2008 | Park | |
| 7,470,086 B2 | 12/2008 | Jennings et al. | |
| 7,525,212 B1 | 4/2009 | Catlin | |
| 7,614,861 B2 | 11/2009 | Nagler | |
| 7,821,151 B2 * | 10/2010 | Le et al. | 290/55 |
| 7,930,889 B1 * | 4/2011 | Brostmeyer | 60/641.6 |
| 2002/0119010 A1 | 8/2002 | Len-Rios | |
| 2002/0178987 A1 | 12/2002 | Eagles et al. | |
| 2003/0178195 A1 * | 9/2003 | Agee et al. | 166/248 |
| 2004/0074235 A1 | 4/2004 | Lampkin et al. | |
| 2004/0191000 A1 * | 9/2004 | Webster et al. | 405/210 |
| 2005/0158184 A1 | 7/2005 | Lin | |
| 2006/0147323 A1 * | 7/2006 | Stute et al. | 417/405 |
| 2007/0089682 A1 | 4/2007 | Mariansky | |
| 2007/0130929 A1 | 6/2007 | Khan et al. | |
| 2007/0234749 A1 | 10/2007 | Enis et al. | |
| 2007/0295673 A1 | 12/2007 | Enis et al. | |
| 2008/0012344 A1 | 1/2008 | Buffard et al. | |
| 2008/0034756 A1 | 2/2008 | Spalte | |
| 2008/0226480 A1 | 9/2008 | Ferran et al. | |
| 2008/0260548 A1 * | 10/2008 | Ahdoot | 417/333 |
| 2009/0021012 A1 | 1/2009 | Stull et al. | |
| 2009/0178384 A1 | 7/2009 | Nakhamkin | |
| 2009/0230696 A1 | 9/2009 | Enis et al. | |
| 2013/0305704 A1 * | 11/2013 | Ingersoll et al. | 60/521 |

FOREIGN PATENT DOCUMENTS

| | | |
|---|---|---|
| CN | 1296327 A | 5/2001 |
| CN | 2924492 Y | 7/2007 |
| CN | 200949502 Y | 9/2007 |
| CN | 101158329 A | 4/2008 |
| CN | 101302751 A | 11/2008 |
| CN | 101368395 A | 2/2009 |
| CN | 201212166 Y | 3/2009 |
| DE | 3720872 A1 | 1/1989 |
| DE | 4307094 A1 | 9/1994 |
| EP | 1638191 A2 | 3/2006 |
| EP | 1734255 A1 | 12/2006 |
| EP | 1764494 A1 | 3/2007 |
| ES | 208995 A2 | 10/1996 |
| FR | 2866096 A1 | 8/2005 |
| FR | 2885961 A1 | 11/2006 |
| GB | 1213112 A | 11/1970 |
| GB | 2013318 A | 8/1979 |
| GB | 2020375 A | 11/1979 |
| GR | 1005210 B2 | 5/2006 |
| JP | 54011517 A | 1/1979 |
| JP | 55109772 A | 8/1980 |
| JP | 56010897 A | 2/1981 |
| JP | 56077568 A | 6/1981 |
| JP | 56148682 A | 11/1981 |
| JP | 57008363 A | 1/1982 |
| JP | 58214608 A | 12/1983 |
| JP | 60037316 B | 8/1985 |
| JP | 63239320 A | 10/1988 |
| JP | 1018266 B | 4/1989 |
| JP | 1177838 A | 7/1989 |
| JP | 2071053 A | 3/1990 |
| JP | 2071054 A | 3/1990 |
| JP | 2271080 A | 11/1990 |
| JP | 5294387 A | 11/1993 |
| JP | 6050109 A | 2/1994 |
| JP | 6173841 A | 6/1994 |
| JP | 7317649 A | 12/1995 |
| JP | 9070238 A | 3/1997 |
| JP | 9149564 A | 6/1997 |
| JP | 2000175377 A | 6/2000 |
| JP | 2006077719 A | 3/2006 |
| JP | 2008309014 A | 12/2008 |
| JP | 2009525432 A | 7/2009 |
| KR | 20030031012 A | 4/2003 |
| KR | 20040092336 A | 11/2004 |
| KR | 1020050076176 A | 2/2007 |
| KR | 20070115019 A | 12/2007 |
| RU | 2321776 C1 | 4/2008 |
| SG | 2006060149 A1 | 3/2008 |
| TW | 200831777 A | 8/2008 |
| TW | 200842250 | 11/2008 |
| WO | 7901154 A1 | 12/1979 |
| WO | 7901158 A1 | 12/1979 |
| WO | 0133150 A1 | 5/2001 |
| WO | 03078812 A1 | 9/2003 |
| WO | 2008045468 A | 4/2008 |
| WO | 2009005383 A1 | 1/2009 |
| WO | 2009015419 A1 | 2/2009 |
| WO | 2009024933 A2 | 2/2009 |

\* cited by examiner

UNDERWATER COMPRESSED FLUID ENERGY STORAGE SYSTEM

CROSS-REFERENCE TO RELATED APPLICATION

The present application claims priority to U.S. Provisional Application 61/245,279 filed Sep. 23, 2009, to U.S. Provisional Application 61/309,415 filed Mar. 1, 2010, to U.S. Provisional Application 61/364,364 filed Jul. 14, 2010, and to U.S. Provisional Application 61/364,368 filed Jul. 14, 2010, the disclosures of which are incorporated herein.

BACKGROUND OF THE INVENTION

Embodiments of the invention relate generally to compressed fluid energy storage and, more particularly, to a method and apparatus of storing compressed fluid in an underwater storage device and extracting energy therefrom. In embodiments where the fluid compressed is air, such inventions are part of a class of energy storage systems known as compressed air energy storage (CAES) systems, but in this document we will use CAES to refer generically to any compressed fluid energy storage system.

Renewable energy (RE) sources offer an alternative to conventional power sources in an age of dwindling non-renewable energy sources and high carbon emissions. However, RE sources are often not fully exploited because many forms of renewable energy are not available when the peak demand is present. For instance, RE sources may be most available during undesirable off-peak hours, or may be located in areas that are remote from population centers or locations where power is most needed, having to share the grid during peak hours along with all the other peak power sources.

RE sources may include hydro power, geothermal, Ocean Thermal Energy Conversion (OTEC), as examples. Hydro power, for instance, when combined with a reservoir is one RE source that can be throttled up and down to match or load-follow the varying power loads. Geothermal and OTEC are also good baseload RE resources; however, locations viable for their use tend to be limited. It is to be understood that an ocean thermal energy converter, while traditionally utilized across the thermocline of an ocean, can additionally apply to fresh bodies of water that have a temperature difference between surface water and deep water. RE sources may also include solar, wind, wave, and tidal, as examples. However these sources tend to be intermittent in their ability to provide power. Energy storage is thus desired for those sources to substantially contribute to the grid energy supply.

For instance, wind energy may be cost effective on a cost per kWh but does not may not produce energy when it's needed. It faces impediments to even modest grid penetration levels largely due to the timing of its power output, which is not only not dispatchable according to the demands of the grid, but it varies uncontrollably according to wind levels. This problem will get worse as more RE sources of all kinds are added to the grid—as long as cost effective storage is unavailable. Above 20% renewable energy fraction, electrical power grids often lose stability without energy storage to modulate energy supply and demand.

Cost-effective storage for the electrical grid has been sought from the beginning of electrical service delivery but is not yet available. The variation in power demand throughout a day, and season-to-season, requires having generation assets that are utilized only part of the time, which can increase capital, operations, and maintenance costs for assets used at less than full capacity. Also some generation assets are difficult to throttle or shut down and are difficult to return to full power in short periods of time. Energy storage can provide a buffer to better match power demand and supply allowing power sources to operate at higher capacity and thus higher efficiency.

Cost parameters of several leading storage technologies may be considered for large scale energy systems and each technology has its own cost drivers. Pumped hydroelectric, for example, has been used for many decades and is often considered the standard by which other grid energy storage ideas are judged. It is efficient from an energy capacity standpoint, consumes no fuel upon harvesting the stored energy, but can only be deployed in limited locations and has high capital cost per unit power. A substantial elevation change and two reservoirs are typically required. Also, most of the viable sites in North America are considered to be already developed, so, regardless of cost, it does not appear that pumped hydroelectric will be able to contribute much additional energy storage capacity. It is also fairly expensive in terms of power cost ($/kW) but nonetheless is widely used when available due to fairly inexpensive cost per unit energy ($/kWh).

CAES is an attractive energy storage technology that overcomes many drawbacks of known energy storage technologies. A conventional approach for CAES is to use a customized gas turbine power plant to drive a compressor and to store the compressed air underground in a cavern or aquifer. The energy is harvested by injecting the compressed air into the turbine system downstream of the compressor where it is mixed with, or heated by natural gas-fired combustion air and expanded through the turbine. The system operates at high pressure to take advantage of the modest volume of the cavern or aquifer. The result is a system that operates with constant volume and variable pressure during the storage and retrieval process, which results in extra costs for the compressor and turbine system because of the need to operate over such a wide range of pressures. Underground CAES suffers from geographic constraints. Caverns may not be located near power sources, points of load or grid transmission lines. In contrast, over 90% of the electrical load in the industrialized world lies within reach of water deep enough for underwater CAES to be practical. Underwater CAES removes many of the geographic constraints experienced by underground CAES.

Also, an important factor for efficient compression and expansion of a fluid is dealing with the heat generated during compression and the heat required during expansion. Conventional CAES reheats air using combustion of natural gas (often by absorbing heat from the gas turbine exhaust) and gives up the heat of compression to the ambient environment. Such systems can include a thermal storage device to enable adiabatic operation. Such systems also often have separate equipment for compression and expansion phases, and therefore have a greater capital expense, as well as higher operating cost and complexity due to the use of natural gas. The result is that the power plant, when utilizing purchased off-peak power to charge the air reservoir can generate power during periods of peak demand, but with additional equipment and higher fuel costs.

Therefore, it would be desirable to design an apparatus and method of storing and recovering energy in a compressed fluid energy storage system in a more efficient and cost-effective manner, without need for external fuel, that is competitive with conventional power sources.

BRIEF DESCRIPTION

According to one aspect of the invention, a compressed fluid storage system includes a bi-directional compressor/ expander (C/E) unit constructed to compress fluid during a first operational mode and allow expansion of fluid in a second operational mode, a fluid storage system positioned on a sea floor under a body of water, and a piping system positioned between the C/E unit and the fluid storage system and configured to pass fluid between the C/E unit and the fluid storage system.

According to another aspect of the invention, a method of using a compressed fluid storage system, the method includes applying rotational power to a shaft of a pressure conversion device in a first rotational direction to compress fluid in a first flow direction through the pressure conversion device, storing the compressed fluid in a fluid storage system that is positioned beneath a surface of a body of water, and passing the compressed fluid from the fluid storage system through the pressure conversion device in a second flow direction to apply rotational power to the shaft in a second rotational direction, wherein the second flow direction is opposite the first flow direction.

According to yet another aspect of the invention, a compressed fluid storage system includes a power source, a unitary compressor/expander (C/E) device capable of both compressing and expanding fluid coupled to the power source via a shaft and comprising a plurality of compression/expansion (C/E) stages that pressurize fluid in a compression mode and expand fluid in an expansion mode, a fluid bag coupled to the plurality of compression/expansion stages of the unitary C/E device and positioned under a body of water, a pressured-fluid conveyance system configured to pass pressurized fluid from the unitary C/E device to the fluid bag when the unitary C/E device is in the compression mode, and configured to pass the pressurized fluid from the fluid bag to the unitary C/E device when the unitary C/E device is in the expansion mode, and a control unit configured to invoke the compression mode in the unitary C/E device, pressurize fluid and direct the pressurized fluid to pass from the plurality of C/E stages of the unitary C/E device to the fluid bag when power is available from the power source, and invoke the expansion mode in the unitary C/E device, direct the pressurized fluid to pass from the fluid bag to the plurality of compression/expansion stages of the unitary C/E device and expand the pressurized fluid when power is selectively desired to be drawn from the fluid bag.

Various other features and advantages will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION

Embodiments of the invention include deployment or installation of compressed fluid storage vessels on a floor of an ocean, sea, lake, reservoir, gulf, harbor, inlet, river, or any other manmade or natural body of water. As used herein, "sea" refers to any such body of water, and "sea floor" refers to the floor thereof "Fluid," as used herein, refers to any compressible gas or liquid such as air, $CO_2$, or the like as well as to a supercritical fluid. "Sediment" (e.g., "sea floor sediment"), as used herein, refers to marine material from the bottom or sea floor of the sea and may include, by way of example, gravel, sand, silt, clay, mud, organic or other material settled onto the floor of the sea.

In disclosed embodiments of the system, compressed fluid is stored in a bag in (or referred to as 'under') a body of water. Hydrostatic pressure of surrounding water becomes the predominant restraining parameter for the compressed fluid, which is pressurized into the bag via a compressor. In traditional "pumped hydro" storage, water is pumped through a substantial geographic elevation. In contrast, in embodiments of the disclosed system, the level of a body of water is essentially lifted through the mechanism of adding fluid below it. The technology applies equally well to an ocean or an inland lake or reservoir. The disclosed system often operates at lower pressure ratios than traditional CAES (based on the depth of the water), and these lower pressure ratios and use of the water as a vast heat sink, in several embodiments as will be discussed, eliminates the need for fossil fuels to reheat the fluid immediately prior to or during the expansion phase. Also, the system operates with a nearly constant storage pressure allowing simpler and more efficient compressor/expander (C/E) designs.

Figure 1:
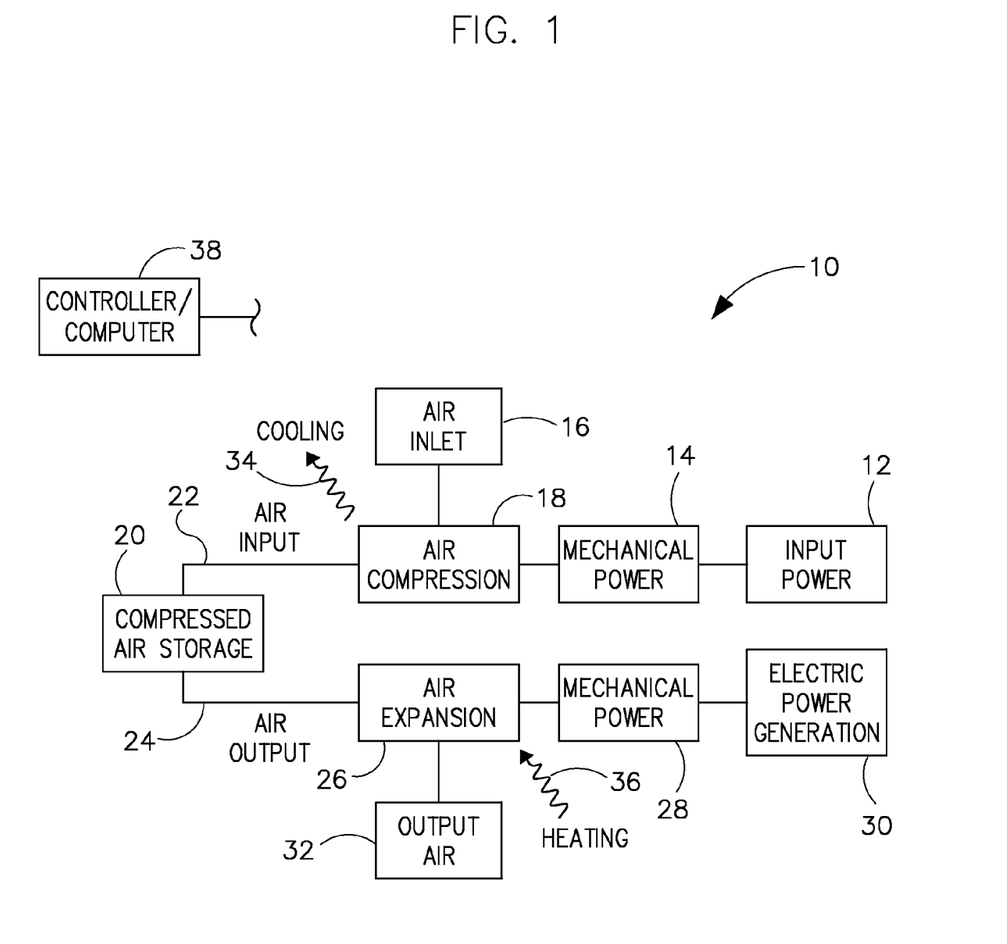
FIG. 1 is a schematic diagram illustrating general functionality of embodiments of embodiments of the invention.

Referring now to FIG. 1, a general functionality of embodiments of the disclosed system is illustrated. System 10 includes input power 12 which can be, in embodiments of the invention, from a renewable energy source such as wind power, wave power (e.g., via a "Salter Duck"), current power, tidal power, or solar power, as examples. In another embodiment, input power 12 may be from an electrical power grid. In the case of a renewable energy (RE) source, such a source may provide intermittent power. In the case of an electrical power grid, system 10 may be connected thereto and controlled in a fashion that electrical power may be drawn and stored as compressed fluid energy during off-peak hours such as during late evening or early morning hours, and then recovered during peak hours when energy drawn from system 10 may be sold at a premium (i.e., electrical energy arbitrage), or to augment base load power systems such as coal to provide peaking capability by storing inexpensive base load power. Another way of operating would be to use system 10 as a base power supply to provide low-cost power therefrom in a generally static mode in lieu of a conventional power source such as coal, and use conventional power sources (e.g., natural gas, diesel, etc. . . . ) as peak power systems to provide transient power as the load fluctuates and exceeds the supply from system 10, thus reducing the average cost of power.

Also, system 10 is not limited to the aforementioned power sources, but applicable to any power source, including intermittently available power sources, or sources from which may be drawn during low-cost or off-peak hours and sold during a period that is desirable, such as during a peak electrical load or generating-plant outage. Further, system 10 is not limited to a single input power 12 but may include multiple sources which may be coupled thereto. In other words, multiple and combined power sources may be included in a single system as input power 12. Input power 12 is coupled to mechanical power 14 to compress fluid from a fluid inlet 16.

Fluid compression 18 may be from a device that can both compress and expand a fluid, depending on direction of rotation, such as a Wankel-type compressor/expander (C/E). However, the invention is not so limited, and any compressor that uses mechanical power to compress a fluid may be implemented according to embodiments of the invention, and any expander that decompresses a fluid to generate mechanical energy may be implemented according to embodiments of the invention. In embodiments of the invention the C/E is capable of generating between 0.2 MW and 3 MW of power; however, the invention is not so limited and may be capable of generating any range of power commensurate with system requirements that may include a power as low as 0.0001 MW and a power as high as 5 MW or greater. Thus, fluid compression 18 occurs as a result of mechanical power 14 using fluid input 16. Fluid compression 18 may occur in one or multiple cycles, and cooling may be introduced via pumps and heat exchangers, between stages, as is known in the art. Cooling may also be achieved through direct contact between the compressed fluid and a cooling fluid. Fluid from fluid compression 18 is conveyed to compressed fluid storage 20 via a fluid input 22. Also, compressed fluid storage 20 may be a bag or other conformal fluid containment device that may be ballasted within a body of water such as a lake, reservoir (natural or man-made), or sea, using sediment as ballast, and at a depth to which fluid may be compressed and stored for later extraction. As such, the volume of fluid is stored nearly isobarically as a function of the amount of fluid therein and as a function of its depth within the body of water.

The fluid storage bags or tubes may be rated to 50° C. In one compressor design according to an embodiment of the invention, where the heat of compression is recovered and stored, the expected exit temperature of the fluid from the expander into the fluid hose is only about 5.5° C. above the water temperature. Where only ambient water is used to cool the compression stages and there is no heat exchanger after the final stage, the temperature of the fluid into the fluid hose may be 30° C. above ambient, or 45° C. in the case of a 15° C. surface ocean temperature. If the tube temperature limit is exceeded for any reason, a temperature alarm can shut down the compressor. One or more temperature sensors may be positioned along the length of a fluid storage tube in a CAES system such that the temperature of the fluid storage tube may be monitored. For example, a temperature alarm may indicate to a system operator that a temperature limit has been reached or exceeded. In addition, an alarm shutdown on the system compressor may cause the compressor to stop supplying compressed fluid to the affected fluid tube to lessen or prevent damage to the fluid storage tube or to the fluid hose connected to the affected fluid storage tube. The bag experiences constant pressure due to the variable-volume design and thus no additional heating occurs within the bag.

When it is desirable to draw stored energy from system 10, compressed fluid may be drawn from compressed fluid storage 20 via fluid output 24 and fluid expansion 26 occurs. As known in the art, fluid expansion 26 results in available energy that may be conveyed to, for instance, a mechanical device, which may extract mechanical power 28 for electrical power generation 30, which may be conveyed to a grid or other device where it is desirable to have electrical power delivered. Outlet fluid 32 is expelled to the environment at generally standard or ambient pressure. In embodiments of the invention, mechanical power 28 may be produced from, as an example, a Wankel-type expander. Further, as will be discussed, mechanical power 14 for fluid compression 18 and mechanical power 28 derived from fluid expansion 26 may be via the same device (i.e., a compression/expansion or "C/E" device) or via a different or separate device within system 10.

In principle, a C/E may be used in an isothermal operation, an adiabatic operation, or a combination thereof. In another example, a C/E may be implemented that does not use a distinct heat exchanger and does not use a thermal reservoir. As is known in the art, when a fluid is compressed, it heats, and when a fluid is expanded, it cools. As such, embodiments of the invention include forced-convection cooling 34 to cool the fluid from fluid compression 18 and forced-convection heating 36 to heat the fluid from fluid expansion 26. Because fluid storage occurs at generally ambient temperature and pressure (i.e., at depth within the body of water as discussed), both cooling 34 for fluid compression 18 and heating 36 after fluid expansion 26 may be performed using the vast amount of fluid that surrounds system 10 (i.e., lake or seawater). As such, system 10 may be operated, in some embodiments, in a generally isothermal manner that cools the fluid to near ambient during compression stage(s) and heats the fluid to near ambient during expansion stage(s). In other embodiments, system 10 may be operated in a generally adiabatic manner where energy from compression is stored via a controlled heat transfer process to a thermal storage tank, and energy to heat the fluid after expansion is likewise drawn from the energy stored in the storage tank, having relatively little heat exchange with the surrounding environment. In such fashion, the system includes a way to modulate or recover the sensible heat in the compressed fluid. However, in either case, pumps and heat exchangers may be employed to cool at desired locations in the system, as understood in the art.

In yet another embodiment, energy from fluid compression 18 is not stored per se, but water is selectively drawn into system 10 by taking advantage of the natural temperature difference between the surface water temperature and the temperature in the depths. In such an embodiment, cooling 34 during fluid compression 18 may be performed using relatively cold water obtained from the depths (i.e., well below water surface), and heating 36 during fluid expansion 26 may be performed using relatively warm water obtained from near the water surface. Utilizing this temperature difference in this manner is actually adding a heat engine cycle on top of the energy storage cycle, thus making it conceivable that more energy would be extracted than was stored, due to the thermal energy input of the water body.

System 10 includes a controller or computer 38 which may be controllably linked to components of system 10.

Figure 2:
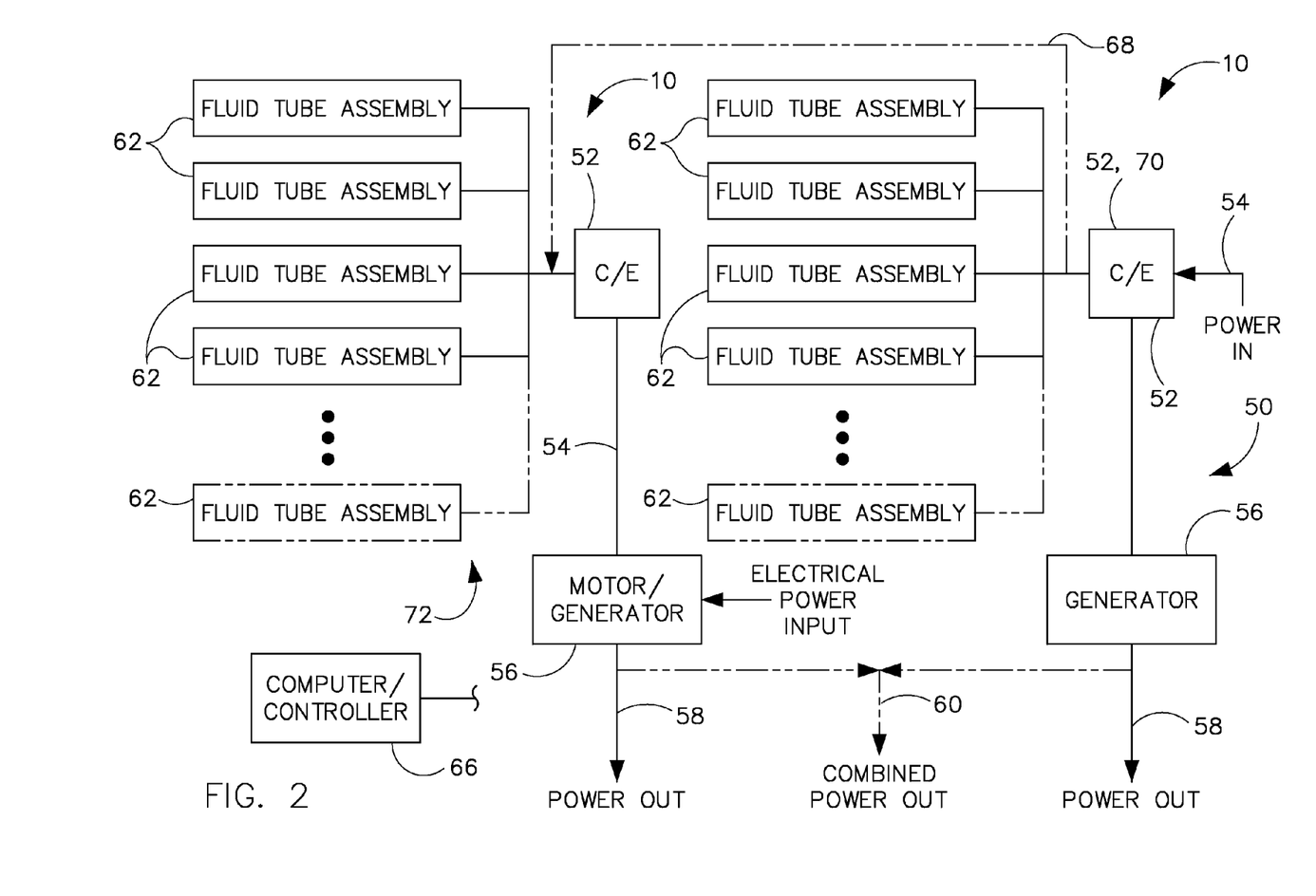
FIG. 2 is a schematic diagram illustrating a system having the functionality illustrated in FIG. 1 according to embodiments of the invention.

Referring now to FIG. 2, multiple systems such as system 10 of FIG. 1 may be deployed according to an embodiment of the invention. As will be described in further detail with respect to additional figures below, each system 10 may include a unitary or bi-directional compressor/expander (C/E) unit that is coupled to a fluid storage tube assembly that is positioned well below the surface of a water body. Each C/E is coupled to an energy source and a generator. The energy source may be a renewable source such as wind or wave power, or it may be from the generator itself, which is caused to operate as a motor having energy drawn from a power grid or from a renewable source such as a solar photovoltaic array.

Thus, FIG. 2 illustrates an overall system 50 having a plurality of systems 10 as illustrated in FIG. 1 and in subsequent figures and illustrations. Each system 10 includes a C/E 52 configured having a power input 54 and also coupled to a generator 56 (or motor/generator). Each generator 56 is configured having a respective power output 58. In one embodiment, each power output 58 is coupled separately to a load or utility grid; however, in another embodiment as illustrated, multiple power outputs 58 from two or more generators 56 may be combined to output a combined power output 60 to a load or utility grid.

Each C/E 52 is coupled to a fluid storage tube assembly 62, which, as will be further discussed, is positioned at depth and is configured to receive compressed fluid from a respective C/E 52. According to embodiments of the invention, each C/E 52 may be coupled to multiple fluid storage tube assemblies 62 via a tube or pipe 64. As such, a single C/E 52 may be coupled to a vast number of fluid-storage assemblies 62 and may be limited by the number of feed lines and the terrain on which the fluid storage tube assemblies 62 are positioned, as examples. Operation of overall system 50 may be controlled via a computer or controller 66, and one skilled in the art will recognize that each system 10 may include control valves, pressure sensors, temperature sensors, and the like, distributed throughout. Controller 66 is configured to pressurize fluid and direct the pressurized fluid to pass from C/E 52 or stages thereof to fluid storage tube assemblies 62 when power is available from the power source, and direct the pressurized fluid to pass from fluid storage tube assemblies 62 to C/E 52 or stages thereof and expand the pressurized fluid when power is selectively desired to be drawn from fluid storage tube assemblies 62.

As such, overall system 50 may be deployed in a modular fashion having multiple systems 10 (only two of which are illustrated in FIG. 2). Accordingly, this modularity provides system resilience and an ability to swap units in the field with minimum overall system downtime by allowing a portion of the system to be taken offline while the rest of the system continues to operate. Modularity also enables separate systems to operate simultaneously in different modes (i.e., one system collects/stores energy while another generates power). Thus, multiple CEs may be ganged together, as illustrated in FIG. 2, enabling modularity. And, each system 10 may be controlled in a fashion where, for instance, an individual fluid storage tube assembly 62 may be decoupled or isolated from its respective C/E 52. Accordingly, during operation, individual systems 10 or components of an individual and specific system 10 may be removed from service for trouble-shooting, repair, or routine maintenance. Thus, the modularity provides ease of servicing that enhances overall reliability, since the overall system 50 would not need to be shut down for servicing.

Further, because of the modularity of overall system 50, additional systems 10 may be added incrementally thereto, or additional storage may be added to each system 10 during operation. Thus, as power demands change over time (i.e., population growth or decrease in a given service area), power and/or storage capacity may be added or removed in a modular fashion consistent with that illustrated in FIG. 2, over time and in concert with changing system requirements. Thus, a modular system is expandable and other systems may be constructed and brought online with minimal impact to overall system downtime and operation.

Additionally, systems 10 of overall system 50 may be operated in separate fashions from one another simultaneously. For instance, in one portion of an array of systems 10, one of the systems 10 may be exposed to a high wind and thus operated in compression mode to store energy therefrom in its respective fluid storage tube assembly 62. However, at the same time, another one of the systems 10 may be in an area receiving little or no wind and thus operated in expansion mode to draw energy from its respective fluid storage tube assembly 62.

As such, overall system 50 may be operated in a flexible fashion that allows multiple modes of operation, and also may be configured in a modular fashion to allow portions thereof to be temporarily shut down for maintenance, repair, and operation, or permanently decommissioned, without having to shut down the overall system 50.

Further, configuration and operation of overall system 50 is in no way limited to the examples given. For instance, instead of wind energy, systems 10 may be coupled to a wave energy source or a water current source, as further examples. Systems 10 may each employ multiple C/Es 52, or C/Es 52 may be configured to share fluid storage therebetween. Thus, in one example, an auxiliary feed line 68 may be positioned and configured to separately couple one C/E 70 of one system 10 with fluid storage tube assemblies 72 of another system. In such fashion, storage capacity of fluid storage tube assemblies 72 may be used during, for instance, repair or maintenance of one C/E 70. In addition, rerouting, an example of which is shown in feed line 68, enables the cooperative use of multiple C/E's 52 and 70 to additional advantage, including modularity, system resilience, incremental expandability of power capacity, field-swappability of C/E units, and the ability to operate one C/E in compression mode and another C/E in expansion mode. These advantages result in a system with graceful degradation, no single point of failure of the entire system, and flexibility to add capability as power and storage requirements increase. It also enables a flow-through mode of operation where power from a prime mover (such as a wind generator, a wave power generator (e.g., via a "Salter Duck"), a current power generator, a tidal power generator, and an ocean thermal energy converter, as examples) passes through a first C/E, compressing fluid, is optionally stored, and passes through a second C/E in expansion mode, generating power for the grid. Such an embodiment eliminates ramp/up and ramp/down time for the system, enabling a standby mode of operation that is ready to absorb power or deliver it on demand without delay.

Figure 3:
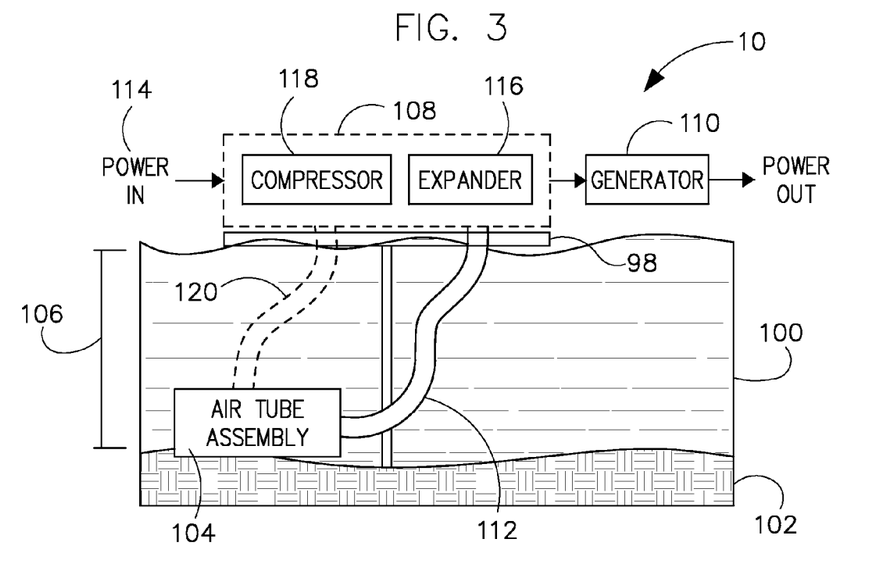
FIG. 3 is a schematic diagram illustrating basic components of a system positioned at sea according to an embodiment of the invention.

Referring now to FIG. 3, basic components of system 10 positioned at sea are illustrated. Components of system 10 may be positioned on a platform 98 proximately to the water surface. Thus, FIG. 3 illustrates a sea 100 and a sea floor 102. Sea 100 includes an ocean, a lake, or a reservoir such as in a dammed river, and in this and all embodiments is not limited to any specific body of water. System 10 includes a flexible fluid bag or fluid bag assembly 104 positioned at an average depth 106, a unidirectional or bi-directional fluid pressure conversion device or compressor/expander (C/E) 108 coupled to a generator 110, and a heat transfer system (pumps and heat exchangers as discussed with respect to FIG. 1, not illustrated). C/E 108 may include multiple stages of compression and expansion, and a heat exchanger package (not shown) may cool or reheat the fluid between the stages of compression or expansion, respectively. The tubes carrying the pressurized fluid are immersed in circulating water, or more commonly, the pressurized fluid is passed over a finned tube heat exchanger inside which flows inside the finned tubes. System 10 may be configured to operate substantially in nearly-isothermal or adiabatic modes.

One skilled in the art will recognize that system 10 of FIG. 3 may include but is not limited to other devices such as a control system, a computer, and one or more clutches to mechanically couple components thereof. The bag 104 is ballasted so it doesn't float to the surface when inflated.

A fluid hose or pipe, or pressurized-fluid conveyance system 112 connects fluid storage bag assembly 104 with the C/E 108 at or near the surface of sea 100. The C/E 108 is coupled to generator 110, which in one embodiment is the same generator used by a wind turbine, with a clutch (shown in FIG. 4). The generator 110 can act as a motor as well to drive the C/E 108 in compressor mode when storing energy, or if the wind is blowing, the wind power can be put into the generator 110. Thus, when full power from the system is desired, for example during peak demand periods on the grid, the stored fluid expanding through the C/E 108 augments the torque to the generator 110. In embodiments, generator 110 is an (alternating current) A/C generator, and in other embodiments, generator 110 is a (direct current) DC generator.

DC power transmission is not often used for land-based transmission because of the cost of conversion stations between transmission lines. However, the efficiency of DC transmission lines can be greater than A/C lines, particularly under salt water. Other advantages of DC power transmission include a clearer power flow analysis and no requirement to synchronize between independent grid sections connected by the DC line. Additional benefits of DC transmission may be realized when the lines are run underwater due to capacitance of the transmission line. Thus, many DC transmission systems are in existence today.

C/E 108 provides the ability to both compress and expand fluid. In one embodiment, C/E 108 is a single component that includes the ability to compress fluid when work is input thereto and to expand fluid to extract work therefrom. In such an embodiment, a single fluid hose or pipe 112 is positioned between fluid storage tube assembly 104 and C/E 108, and fluid is pumped to and from fluid storage tube assembly 104 using fluid hose or pipe 112. Thus, when power is input 114 to C/E 108, C/E 108 operates to compress fluid, convey it to fluid storage tube assembly 104 via fluid hose or pipe 112, and store the energy therein. Power 114 may be provided via a renewable source such as wind, wave motion, tidal motion, or may be provided via the generator 110 operated as a motor which may draw energy from, for instance, a power grid. Also, C/E 108 may be operated in reverse by drawing compressed stored energy from fluid storage tube assembly 104 via fluid hose or pipe 112. Thus, by reversing its motion, C/E 108 may be caused to alternatively compress or expand fluid based on a direction of operation or rotation. Note that the generator 110 provides electrical power in one embodiment. Alternatively, mechanical power may be utilized directly from the expander without the use of generator 110.

However, in another embodiment, compressor and expander functionalities of C/E 108 are separated. In this embodiment, an expander 116 is coupled to fluid storage tube assembly 104 via fluid hose or pipe 112, and a compressor 118 is coupled to fluid storage tube assembly 104 via the same fluid hose 112, or, alternatively, a separate fluid hose, pipe, or piping system 120. Thus, in this embodiment, power may be input 114 to compressor 118 via, for instance, a renewable energy source that may be intermittent—providing compressed fluid to fluid storage tube assembly 104 via separate fluid hose or pipe 120. In this embodiment, energy may be simultaneously drawn from fluid storage tube assembly 104 via fluid hose or pipe 112 to expander 116. Thus, while providing the system flexibility to simultaneously store and draw power, this embodiment does so at the expense of having separate compressor 118 and expander 116 (additional compressor and expander not illustrated).

Figure 4:
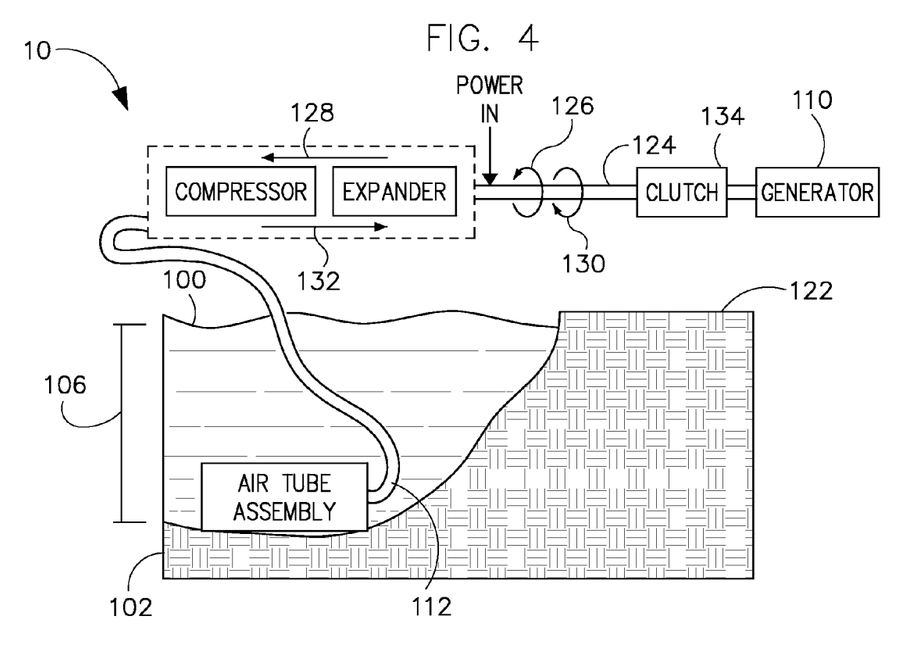
FIG. 4 is a schematic diagram illustrating basic components of a system positioned on land according to an embodiment of the invention.

Referring now to FIG. 4, basic components of system 10 positioned on land are illustrated. Much like system 10 of FIG. 3, system 10 of FIG. 4 is able to receive power from a grid, from one or more renewable energy systems, or both. This system is likewise able to store energy in an underwater isobaric fluid storage bag or tube assembly that is compressed in a C/E device and to extract the energy therefrom also via the C/E device. The system may be configurable to operate in isothermal or adiabatic mode.

An important factor in whether the fluid passageway from the surface to the bag should be rigid or flexible is whether the surface unit is floating or fixed to the sea floor. In deeper water, many RE harvesting schemes use a floating and anchored base. So if the wind or wave direction changes, the position of the base moves until the anchor lines are tensioned in a new direction.

Rigid fluid pipes are generally less expensive since they may be simply steel pipes with diameters that are commonly used in the offshore marine industry. The deployment techniques can be a bit more involved since field joints (those connected in the field, not at the manufacturing yard) will be needed for deep or long pipes. A flexible hose is easier to fabricate completely on shore and deploys more easily, but it requires a more complicated and expensive design. Such hoses have a relatively flexible liner that in one embodiment provides the fluid seal with a braided overwrap of high strength material like metal or fiberglass to carry the pressure load. The diameter of these hoses for a 2.5 MW C/E unit (a size similar to an offshore wind turbine) could be, in one embodiment, about 28 cm in diameter (11") for a bag depth of 100 m and has operating pressures of 1.1 million Pascals (165 PSI). Offshore platforms deal with floating, moored platforms and "rigid" connections to the bottom sediments (e.g., drill shafts), so a flexible hose is not strictly required for such moored platforms. The deflection strains over the length of the pipe could be well inside the limits of the pipe's structural capabilities. Also note that the pressure difference between the fluid inside and the exterior pressure varies with the depth. Near the bottom of the pipe/hose the pressure differences are small, which is why a thin plastic bag can hold the pressurized fluid at the floor, suggesting hybrid or combination solutions where a flexible and fairly unreinforced hose can be used near the bag and a rigid, simple pipe used in the upper sections.

FIG. 4 illustrates a system 10 where components other than compressed fluid transmission and storage are located on land 122. Thus, in this system, capital cost may be reduced by avoiding the cost related to off-shore setup and operation. However, operational locations may be more limited, as it may be desirable to operate in 100 feet of water or deeper. Thus, in order to reach such desirable depths, it may be necessary to convey pressurized fluid over longer distances. Further, it is often desirable for environmental, aesthetic, and other reasons to locate RE power systems well away from populated areas. In addition, renewables such as wind typically provide much greater power at distances removed from land shapes and other wind obstructions. As such, FIG. 4 illustrates a system 10 configured to operate on land according to embodiments of the invention. System 10 of FIG. 4 may incorporate elements of FIGS. 1 through 3 as discussed above. In one embodiment, bi-directional C/E 108 includes a shaft 124 configured to operate in a first rotational direction 126 to compress fluid in a first flow direction 128 during a compression phase causing fluid to pass through fluid hose or pipe 112 to storage. In this embodiment, shaft 124 of C/E 108 may be caused to operate in a second rotational direction 130 that is opposite first rotational direction 126 by expanding fluid from storage and flowing the fluid through C/E 108 in a second flow direction 132. A clutch 134 couples shaft 124 to generator 110, in this embodiment, to enable energy extraction from storage via generator 110 and to de-couple generator 110 when power is input to C/E 108 by a source other than generator 110. And, although bi-directional operation is illustrated with respect to FIG. 4, it is to be understood that all systems disclosed herein may be uni-directionally configured as well.

Figure 5:
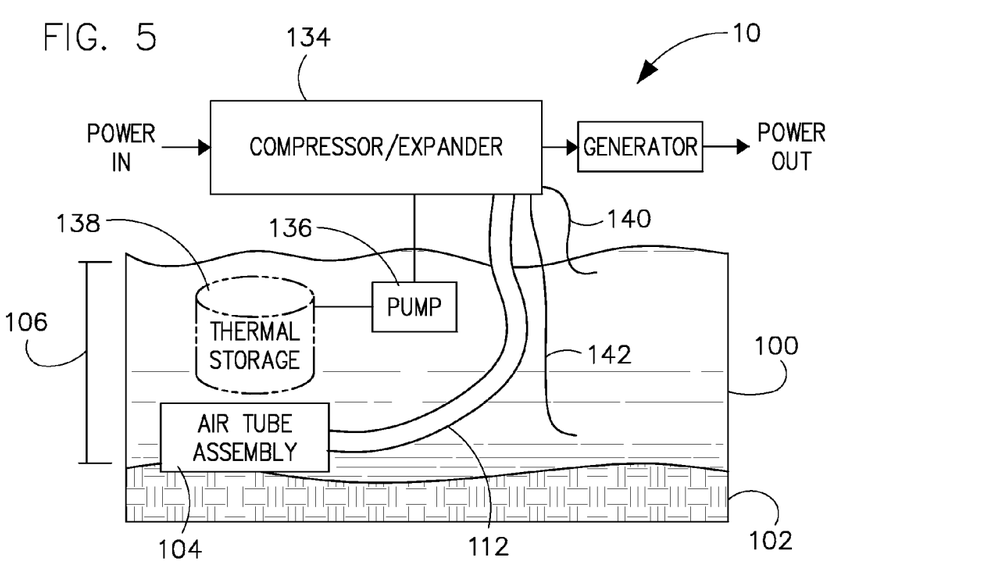
FIG. 5 is a schematic diagram illustrating differences between adiabatic and isothermal operation.

FIG. 5 illustrates differences between adiabatic and isothermal operation. Isothermal operation typically refers to operation where a C/E is bathed in a coolant or otherwise cooled via a pump/heat exchanger during compression and warmed by a thermal reservoir during expansion steps (such as fluid compression 18 and fluid expansion 26 illustrated in FIG. 1) while adiabatic operation typically refers to a system having stored energy and relatively little heat transfer with the surrounding environment, and energy from fluid compression 18 may be stored in a thermal storage system. One skilled in the art will recognize that any C/E capable of both compression and expansion may be operated in an isothermal fashion, an adiabatic fashion, or in an adiabatic fashion having intercooling between multiple stages. In such embodiments, it is possible to cool or warm using a reservoir of fluid (i.e., a lake or ocean, etc.), or energy may be stored from the heat of compression and stored for later use to heat the C/E during expansion. In addition, the C/E may be operated in an enhanced isothermal mode of operation. It is common for the surface of a body of water to be at one temperature, while the bottom of a body of water to be at another temperature. It is possible to compress using the colder water source and expand using the warmer water source. In this way, heat energy is extracted from the body of water and improves the efficiency of the storage device. In principle, it is possible to extract more energy from the storage device than was input by the prime mover, because additional thermal energy is added by the thermal energy transferred from the body of water to the system, potentially overcoming the system losses.

Typically, isothermal operation takes advantage of the vast reservoir of water in or near which a system will be placed. Thus, a pump 136 may be positioned to feed water to the compressor/expander between compression/expansion stages thereof. However, in an alternate embodiment, adiabatic operation may be implemented by including a thermal storage tank 138 coupled to the compressor/expander via pump 136 and configured to extract energy between stages after compression and to add energy between stages after expansion. As is known in the art, large cooling tanks may be operated in such a fashion that thermal stratification occurs therein; thus, hot water may be fed to and drawn from the top of thermal storage tank 138, and cold water may be fed to and drawn from the bottom of thermal storage tank 138. Thus, in one example, during compression, cold water could be drawn from the bottom (relatively cold) portion of the tank and returned to the top (relatively hot). Conversely, during expansion, hot water could be drawn from the top (relatively hot) portion of the tank and returned to the bottom (relatively cold). Thus, in both modes of operation, stable stratification of the thermal storage tank is achieved, preserving the thermal differences of the water portions due to low inherent thermal diffusivity of water under stable conditions.

In one embodiment and as discussed above, in lieu of a thermal storage tank, the effect of adiabatic operation may be realized to an extent by extracting relatively cold water from a deep sea depth via a cold inlet line or heat exchanger feed line 140, and extracting relatively warm water from near the water surface via a warm inlet line or heat exchanger feed line 142. Further, as understood in the art, thermal storage tank 138 may be positioned on a platform and positioned over the water surface, immersed in the water itself, installed on the sea floor or lake floor, or positioned on land (particularly in a land-based system). Further, in an embodiment where thermal storage tank 138 is immersed, according to one embodiment, algae and other sea life may be encouraged to reside on the surface of thermal storage tank 138 in order to enhance the insulating ability thereof.

Further, one skilled in the art will recognize that power output such as combined power output 60 of FIG. 2 may be via DC electrical transmission or A/C electrical transmission. Thus, in one embodiment, output electrical power is stepped up to a high A/C voltage and transmitted to a load or grid, while in another embodiment, a DC voltage is transmitted to a load or grid. As is understood in the art, A/C typically includes relatively higher transmission costs but lower capital expense compared with DC.

As such, embodiments of the disclosed invention include an improved efficiency over other RE systems such as conventional CAES due to a lower heat of compression, an approximately isobaric or constant pressure operation, a decreased temperature and pressure differentials, and the use of a relatively low speed rotary engine design. Embodiments of the invention also decrease levelized cost of energy delivered to the grid by eliminating fuel costs and by decreasing capital costs of CAES technology.

Positive displacement machines generally operate at lower speeds than turbines, leading to fewer tolerance constraints and hence lower fabrication costs. Typically, positive displacement machines trap a fixed amount of fluid that is forced into a discharge pipe. Positive displacement machines also efficiently scale down in size, leading to machines that can be modular and flexible when compared to a turbine. As such, capital costs may be reduced for a positive displacement machine, as turbines tend to be expensive due to the need to operate at high tangential speeds for aerodynamic compression and expansion. High turbine speeds also can create substantial stresses and lubrication challenges, particularly when operating at higher temperatures during compression. High speed turbines also typically cannot efficiently operate in reverse direction to extract work from a high pressure fluid due to differences in the optimal turbine blade shape in compression and expansion.

Thus, a general approach to capital cost reduction is to use a machine that is both inexpensive and can be used in a compressing mode when rotated in a first direction during a first operational cycle (e.g., during storage), and in an expanding mode when rotated in a second direction that is opposite the first direction during a second operational cycle (e.g., during energy extraction). However, some positive displacement machines have a reverse flow direction without requiring a change in shaft rotation direction. Efficiency may be increased by using many stages in both compression and expansion, and ambient temperature water may be employed to keep temperature changes to a minimum. Positive displacement machines may be designed to perform both functions (compression and expansion) well in contrast to a dynamic compressor or turbine.

Typical internal combustion engines or reciprocating fluid compressors can efficiently provide both the compression and expansion functions. Such machines typically have compression ratios of approximately 4 to 12 per stage, which makes the machine simple and capable of fairly high pressure ratios with just a few stages. However, these relatively high pressure ratios can be inefficient in a C/E application if the high-temperature energy in the compressed fluid is not captured, efficiently stored and reused. This issue can be mitigated using interstage coolers. Minimum compressor input energy and maximum energy recovery occurs if the fluid temperature does not change much through the process. Efficient machines cool the fluid between compression stages and conversely heat it between stages of expansion. Thus, for smaller pressure changes per stage, it is easier to keep temperature variations to a minimum, improving efficiency when using a constant temperature heat source/sink and/or reducing lost sensible heat in the fluid and thermal storage vessels. Because the overall system design can benefit from many small pressure ratio compressions, one strategy would be to use a rotary compressor with a core similar to a Wankel engine but with different volume ratios for each successive rotor, potentially with multiple compression zones per impeller rotation. Fluid compressed modestly per compression cycle and per compression stage can be directed into a seawater-cooled (or heated) heat exchanger. Fluid can then be directed through another port into another section of the compressor.

Figure 6:
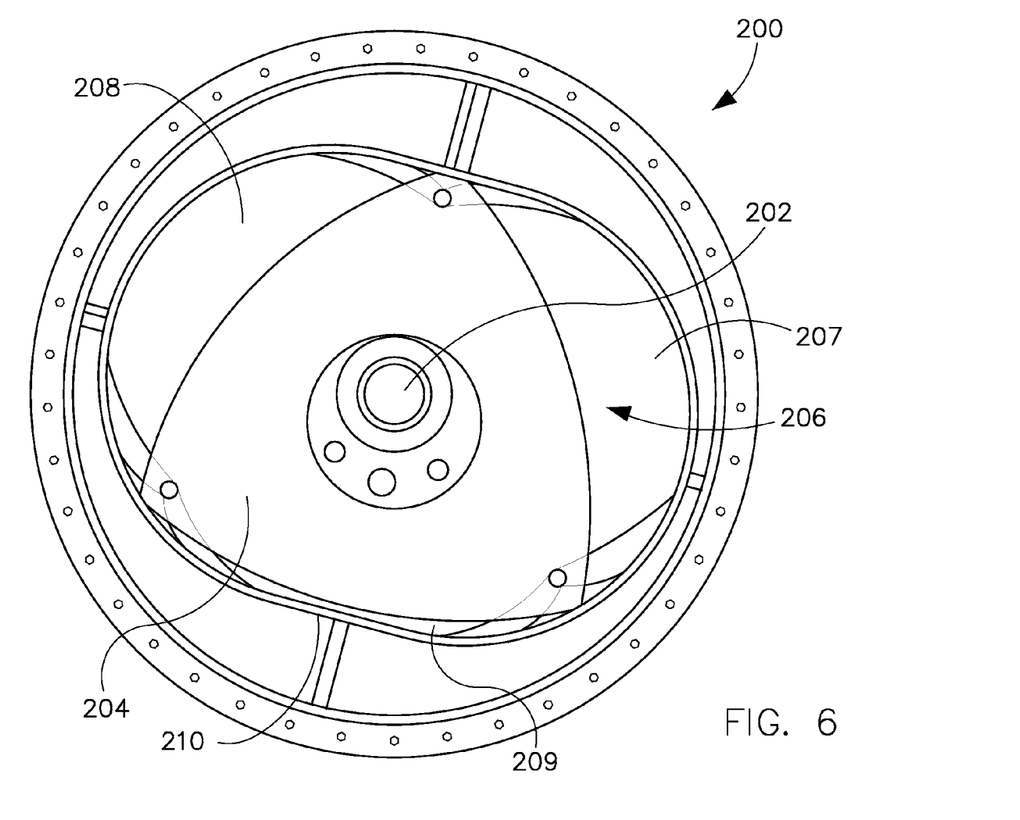
FIG. 6 illustrates a rotary Wankel compressor/expander (C/E).

As such, according to one embodiment, multiple stages share a common shaft or multiple lobes within a rotary section of a C/E that is configured to operate bi-directionally. The basic design can be adjusted to different pressure ratios, specific to a unique depth and storage pressure by adjusting clearances of the rotor and cavity wall. Thus, because each installation of a system may have a unique depth and storage pressure, a flexible design of a C/E can save development cost while maximizing thermodynamic efficiency. As such, referring to FIG. 6, a rotary Wankel C/E 200 having a center shaft 202 and an eccentrically loaded rotor. Rotary Wankel C/E 200 includes an oblong cavity 206, and eccentrically loaded rotor 204 is positioned therein. Three cavities 207, 208, and 209 (i.e., C/E stages 207, 208, and 209) are formed between eccentrically loaded rotor 204 and an outer housing 210. As understood in the art, ports (not shown) may be coupled to regions of the housing 210. The size and positioning of these ports and the target output pressure determine the resulting pressure ratio for these modest pressure ratio stage designs.

Figure 7:
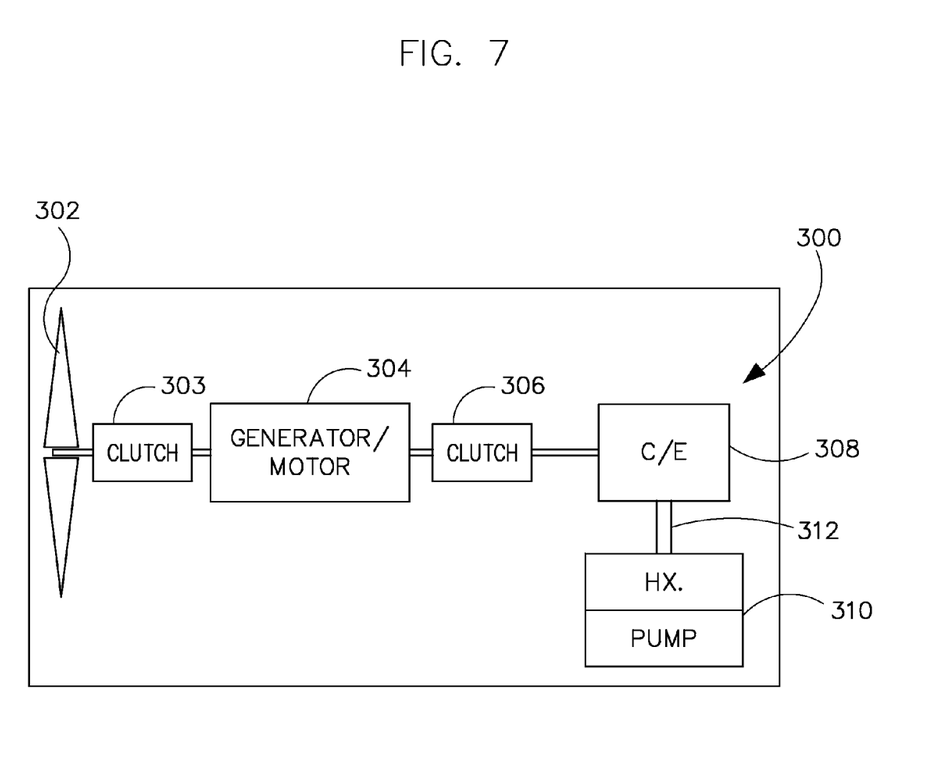
FIG. 7 illustrates a system having a clutch and heat exchanger according to an embodiment of the invention.

Some drive train designs can benefit from a clutch between a motor/generator and a C/E according to embodiments of the invention. A clutch offers some flexibility on how power can be blended in the system. Mechanical power that drives the system, such as a wind turbine or other RE power source, can be coupled to the C/E via a clutch in order to selectively engage and disengage the C/E. Thus, referring to FIG. 7, a system 300 much like system 10 illustrated above may include a prime mover or RE power source 302 such as a wind turbine or other RE devices as described. System 300 includes a generator/motor 304 coupled to RE power source 302 via a clutch 303, a clutch 306 coupling generator/motor 304 to a C/E 308, a heat exchanger/pump combination 310, and a fluid passageway (not illustrated) coupled to C/E 308 and configured to be attached to a fluid storage device, such as flexible fluid bag or fluid bag assembly 104 illustrated above. Also, although a single passageway 312 is illustrated that couples heat exchanger/pump combination 310 to C/E 308, it is to be understood that multiple passageways 312 may be included, according to the invention, enabling coolant to pass to interstage regions of a multistage C/E. Thus, system 300 illustrates an RE power source 302 coupled to generator/motor 304, and if clutch 306 engages C/E 308 to generator/motor 304, then power can go into C/E 308 as well, which, according to one embodiment, includes compressed fluid passageways connected to the heat exchanger of heat exchanger/pump combination 310. In such a fashion, RE power source 302 can simultaneously generate electricity in generator/motor 304 while also compressing fluid in C/E 308. In another mode of operation, C/E 308 can be run in expansion mode to add power to generator/motor 304 to augment power of RE power source 302. Clutch 306 allows C/E 308 to be decoupled from generator/motor 304 if desired, depending on whether the current objective is to store energy for the future, release stored energy, or neither of these. The RE source 302 can also turn the generator but at a speed that generally does not create or draw electrical power, putting most of the energy into the CE, which compresses fluid for use later. Another option (not shown) is to put a clutch between the RE source 302 and the Generator/Motor 304 to allow the CE and the Generator/Motor to operate independent of the motion from 302. Yet another option is to de-excite the field coils of such an alternator/generator during compression, allowing nearly all of the energy from prime mover power source 302 to pass through the clutch 306 to the C/E 308. Those of skill in the art would understand that an alternator with field excitation comprises a form of electrical generator in this context.

Embodiments of the invention have broader potential application than underground CAES. It can be located offshore, in proximity to nearly all major coastal population centers, and it also can be located in lakes and reservoirs serving in proximity to inland population centers. CAES systems typically include sites with suitable geologic formations, which are often not available in close proximity to many major load centers. Transmission line congestion and capacity constraints make it impractical to locate energy storage facilities long distances from load centers. Therefore, underground CAES does not have the potential to provide a ubiquitous solution to grid-scale energy storage needs.

Embodiments of the invention include design and operation with existing marine RE systems that include but are not limited to conventional wind power, hydro kinetic systems such as wave and sub-sea turbines, and Ocean Thermal Energy Conversion (OTEC) systems. However, in addition, embodiments of the invention include standalone storage systems that can be remotely located in a marine environment, which do not take advantage of existing RE systems.

Further, in order to reduce or eliminate negative impacts of RE systems, in one embodiment, bags are deployed to a benthic zone. Typically, the benthic zone is an ecological region of a body of water such as an ocean or lake having organisms that live therein called benthos. Benthos generally live in close relationship with a bottom or floor of a body of water, many of which permanently attach to the bottom. The benthic region begins at a shoreline and extends downward along a surface of the continental shelf. At the continental shelf edge, typically approximately 200 meters deep, a deepening gradient begins that is known as the continental slope extending deep to the abyssal sea floor. Thus, according to embodiments of the invention, it is desirable to deploy systems in the benthic zone but at depths below which photosynthesis is predominant, the marine life thereby being minimally impacted. Materials of construction are generally non-toxic. Small fractions of a sea floor may be dedicated to storage to provide substantial amounts of storage capability over a larger area, while at the same time leaving significant fractions of the seafloor as habitat for the benthos.

The disclosed method and apparatus provides for computer control to cause the system to store compressed fluid in an underwater storage device and to extract energy therefrom.

One skilled in the art will appreciate that embodiments of the invention may be interfaced to and controlled by a computer or a computer readable storage medium having stored thereon a computer program. The storage device comprises a computer readable storage medium, which includes a plurality of components such as one or more of electronic components, hardware components, and/or computer software components. These components may include one or more computer readable storage media that generally stores instructions such as software, firmware and/or assembly language for performing one or more portions of one or more implementations or embodiments of a sequence. These computer readable storage media are generally non-transitory and/or tangible. Examples of such a computer readable storage medium include a recordable data storage medium of a computer and/or storage device. The computer readable storage media may employ, for example, one or more of a magnetic, electrical, optical, biological, and/or atomic data storage medium. Further, such media may take the form of, for example, floppy disks, magnetic tapes, CD-ROMs, DVD-ROMs, hard disk drives, and/or electronic memory. Other forms of non-transitory and/or tangible computer readable storage media not list may be employed with embodiments of the invention.

A number of such components can be combined or divided in an implementation of a system. Further, such components may include a set and/or series of computer instructions written in or implemented with any of a number of programming languages, as will be appreciated by those skilled in the art. In addition, other forms of computer readable media such as a carrier wave may be employed to embody a computer data signal representing a sequence of instructions that when executed by one or more computers causes the one or more computers to perform one or more portions of one or more implementations or embodiments of a sequence.

According to one embodiment of the invention, a compressed fluid storage system includes a bi-directional compressor/expander (C/E) unit constructed to compress fluid during a first operational mode and allow expansion of fluid in a second operational mode, a fluid storage system positioned on a sea floor under a body of water, and a piping system positioned between the C/E unit and the fluid storage system and configured to pass fluid between the C/E unit and the fluid storage system.

According to another embodiment of the invention, a method of using a compressed fluid storage system, the method includes applying rotational power to a shaft of a pressure conversion device in a first rotational direction to compress fluid in a first flow direction through the pressure conversion device, storing the compressed fluid in a fluid storage system that is positioned beneath a surface of a body of water, and passing the compressed fluid from the fluid storage system through the pressure conversion device in a second flow direction to apply rotational power to the shaft in a second rotational direction, wherein the second flow direction is opposite the first flow direction.

According to yet another embodiment of the invention, a compressed fluid storage system includes a power source, a unitary compressor/expander (C/E) device capable of both compressing and expanding fluid coupled to the power source via a shaft and comprising a plurality of compression/expansion (C/E) stages that pressurize fluid in a compression mode and expand fluid in an expansion mode, a fluid bag coupled to the plurality of compression/expansion stages of the unitary C/E device and positioned under a body of water, a pressurized-fluid conveyance system configured to pass pressurized fluid from the unitary C/E device to the fluid bag when the unitary C/E device is in the compression mode, and configured to pass the pressurized fluid from the fluid bag to the unitary C/E device when the unitary C/E device is in the expansion mode, and a control unit configured to invoke the compression mode in the unitary C/E device, pressurize fluid and direct the pressurized fluid to pass from the plurality of C/E stages of the unitary C/E device to the fluid bag when power is available from the power source, and invoke the expansion mode in the unitary C/E device, direct the pressurized fluid to pass from the fluid bag to the plurality of compression/expansion stages of the unitary C/E device and expand the pressurized fluid when power is selectively desired to be drawn from the fluid bag.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressed fluid storage system comprising:
   a unitary positive displacement compressor/expander (C/E) unit constructed to compress fluid during a compression mode and allow expansion of fluid in an expansion mode, the C/E unit comprising a plurality of C/E stages that pressurize fluid in the compression mode and expand fluid in the expansion mode;
   a fluid storage system positioned on a sea floor under a body of water;
   a piping system positioned between the C/E unit and the fluid storage system and configured to pass fluid between the C/E unit and the fluid storage system; and
   a heat exchanger coupled to the C/E unit to pump water thereto from the body of water during operation, wherein the heat exchanger provides interstitial cooling between each of the C/E stages while operating in the compression mode in a substantially adiabatic and isobaric fashion.

2. The system of claim 1, comprising a first operational mode and a second operational mode, wherein the first and the second operational modes include rotation of a shaft of the C/E unit that is in the same rotational direction.

3. The system of claim 1 wherein the first operational mode includes rotation of a shaft of the C/E unit that is in a first rotational direction, and the second operational mode includes rotation of the shaft of the C/E unit that is in a second rotational direction that is opposite the first rotational direction.

4. The system of claim 1 wherein the C/E unit is positioned on a platform that is located at a surface of the body of water, and attached to the sea floor.

5. The system of claim 1 wherein the fluid storage system comprises one or more flexible bags configured to receive pressurized fluid via the piping system and pressurize the flexible bag against surrounding water.

6. The system of claim 1 the C/E unit includes a rotating component configured to rotate in a first rotational direction during a first operational mode and to rotate in a second rotational direction during a second operational mode.

7. The system of claim 1 wherein the piping system comprises one of a rigid pipe, a flexible hose, and a combination thereof.

8. The system of claim 1 wherein the C/E unit is configured to operate at a pressure that corresponds to a pressure associated with a depth of the fluid storage system from sea level.

9. The system of claim 1 comprising a generator coupled to the C/E unit via a clutch, wherein the generator is configured to output electrical power to an electrical grid when the generator is coupled to the C/E unit via the clutch.

10. The system of claim 9 comprising a power source coupled to the C/E unit via the clutch.

11. The system of claim 1 wherein the heat exchanger comprises heat exchanger feed lines configured to selectively draw water from at a surface of the body of water and from at the sea floor, the heat exchanger feed lines including a first feed line having a first length and being positioned to draw the water from at the surface of the body of water and a second feed line having a second length and being positioned to draw the water from at the sea floor.

12. The system of claim 1 wherein the C/E unit is capable of generating between 0.2 MW and 3 MW of power.

13. The system of claim 1 comprising a power input device coupled to the C/E unit, the power input device configured to receive power from one of a wind generator, a Salter duck, a current power generator, and a tidal power generator.

14. The system of claim 11, wherein the water at the surface of the body of water is at a first temperature and the water at the sea floor is at a second temperature that is different from the first temperature, the lower temperature water being piped through the second feed line and used by the heat exchanger to the C/E in the first operational mode, and the higher temperature water being piped through the first feed line and used by the heat exchanger to the C/E in the second operational mode.

15. A method of using a compressed fluid storage system, the method comprising:
applying rotational power to a shaft of a unitary positive displacement compressor/expander unit to compress fluid in a first flow direction through the unitary positive displacement compressor/expander unit;
storing the compressed fluid in an isobaric fluid storage system that is positioned beneath a surface of a body of water; and
operating the compressed fluid storage system in adiabatic manner;
passing the compressed fluid from the fluid storage system through the unitary positive displacement compressor/expander unit in a second flow direction to expand the fluid and thereby to apply rotational power to the shaft the second flow direction being opposite the first flow direction;
wherein the rotational power applied to the shaft of the unitary positive displacement compressor/expander unit during compression and the rotational power applied to the shaft of the unitary positive displacement compressor/expander unit during expansion cause the shaft to rotate in the same direction.

16. The method of claim 15 comprising extracting power from the shaft by expanding the compressed fluid in the unitary positive displacement compressor/expander unit.

17. The method of claim 15 wherein conveying the compressed fluid comprises conveying the compressed fluid via one of a rigid pipe, a flexible hose, and a combination thereof.

18. The method of claim 15 comprising engaging the shaft to a generator via a clutch to extract the power therefrom as electrical power via the generator.

19. The method of claim 15 comprising positioning the fluid storage system on a sea floor and at a benthic depth within the body of water.

20. The method of claim 15 comprising generating the power that is applied to the shaft via one of a wind generator, a Salter duck, a wave generator, a current power generator, an ocean thermal energy converter, and a tidal power generator.

21. The method of claim 15 further comprising selectively controlling operation of the unitary positive displacement compressor/expander unit in a compression mode and in an expansion mode by way of a control unit operatively connected to the unitary positive displacement compressor/expander unit.

22. The method of claim 21 wherein selectively controlling operation of the unitary positive displacement compressor/expander unit in the compression mode and in the expansion mode comprises selectively controlling control valves in the unitary positive displacement compressor/expander unit, and wherein the selective controlling of the control valves enables rotation of the shaft the same direction during both compression and expansion.

23. A compressed fluid storage system comprising:
a power source;
a unitary positive displacement compressor/expander (C/E) device capable of both compressing and expanding fluid coupled to the power source via a shaft and comprising a plurality of compression/expansion (C/E) stages that pressurize fluid in a compression mode and expand fluid in an expansion mode;
a fluid bag coupled to the plurality of compression/expansion stages of the unitary positive displacement C/E device and positioned under a body of water;
a pressured-fluid conveyance system configured to pass pressurized fluid from the unitary positive displacement C/E device to the fluid bag when the unitary C/E device is in the compression mode, and configured to pass the pressurized fluid from the fluid bag to the unitary positive displacement C/E device when the unitary C/E device is in the expansion mode;
a control unit configured to:
invoke the compression mode in the unitary positive displacement C/E device, pressurize fluid and direct the pressurized fluid to pass from the plurality of C/E stages of the unitary positive displacement C/E device to the fluid bag when power is available from the power source; and
invoke the expansion mode in the unitary positive displacement C/E device, direct the pressurized fluid to pass from the fluid bag to the plurality of compression/expansion stages of the unitary positive displacement C/E device and expand the pressurized fluid when power is selectively desired to be drawn from the fluid bag; and
a heat exchanger coupled to the unitary positive displacement C/E device and configured to:
cool the fluid when the fluid is pressurized; and
warm the fluid when the pressurized fluid is expanded;
wherein the heat exchanger provides interstitial cooling and warming between each of the C/E stages in a substantially adiabatic and isobaric fashion.

24. The system of claim 23 comprising a sediment ballast positioned within the fluid bag.

25. The system of claim 23 wherein the unitary positive displacement C/E device has a power capability of between 0.2 MW and 3 MW.

26. The system of claim 23 wherein the unitary positive displacement C/E device is configured to operate at a pressure ratio that corresponds to a water pressure at the depth of the fluid bag within the body of water and an ambient fluid pressure.

27. The system of claim 23 comprising:
a generator to convert mechanical power to electrical power; and
a clutch for coupling the unitary positive displacement C/E to the generator;

wherein the control unit is configured to couple the generator to the unitary positive displacement C/E device via the clutch when the power is desired to be drawn from the fluid bag.

28. The system of claim 23 wherein the power source is one of a wind generator, a Salter duck, a wave generator, a current power generator, an ocean thermal energy converter, and a tidal power generator.

29. The system of claim 23 further comprising heat exchanger feed lines connecting the heat exchanger to the unitary positive displacement C/E device and configured to selectively draw water from at a surface of the body of water and from at the sea floor.

30. The system of claim 29, wherein the water at the surface of the body of water is at a first temperature and the water at the sea floor is at a second temperature that is different from the first temperature, the lower temperature water being used to cool the fluid in the unitary positive displacement C/E device in compression mode, and the higher temperature is used to heat the fluid in the unitary positive displacement C/E device in expansion mode.

31. The system of claim 23, wherein the compression mode comprises rotation in one direction, and the expansion mode comprises rotation in the other direction.

* * * * *